CHARACTER RECOGNITION APPARATUS

Filed April 27, 1965 3 Sheets-Sheet 1

INVENTORS
THOMAS MC CARTHY
PHILIP F. MEAGHER
REINI J. NORMAN
BY
Robert E. Sandt
AGENT Aug. 5, 1969 T. McCARTHY ETAL 3,460,091

CHARACTER RECOGNITION APPARATUS

Filed April 27, 1965 3 Sheets-Sheet 3

United States Patent Office 3,460,091

Patented Aug. 5, 1969

3,460,091

CHARACTER RECOGNITION APPARATUS

Thomas McCarthy, Peekskill, N.Y., Philip F. Meagher, Los Angeles, Calif., and Reini J. Norman, Mahopac, N.Y., assignors to International Business Machines Corporation, Armonk, N.Y., a corporation of New York Filed Apr. 27, 1965, Ser. No. 451,126

Int. Cl. G06k 9/16

U.S. Cl. 340—146.3 6 Claims

ABSTRACT OF THE DISCLOSURE

A curve follower character recognition system recognizes provisionally what appears to be either the sickle portion or the horizontal bar of a five to be potential fragments of a "broken" 5. Then the curve follower is caused to scan back and forth laterally and up and down in the area where the appropriate complementary segment of the 5 should be located relative to the segment which has been initially provisionally identified.

This invention relates to shape recognition apparatus, and more particularly to apparatus for the recognition of lexical symbols, most particularly handwritten lexical symbols.

Discontinuously formed, or broken, lexical symbols present a particularly vexing problem to a curve follower type of character recognition machine, because a break in the line pattern may well cause the apparatus to ignore a significant fragment of the character or to attempt to treat the two separate fragments as two separate characters, each of which will fail to be recognized. Minor breaks in the character line are usually bridged by the follower, which includes special circuits to test each apparent line end for legitimacy. The follower extends its following action beyond each line end, seeking to bridge any gaps in the line. If none is found, the follower follows around the end of the line and reverses its direction of follow. When the break is too great to be bridged by this prior special feature, the instant invention comes into play. It operates to recognize a character fragment, and then seeks out the missing fragment in an area which is spatially related to the identified fragment in accordance with the identity of the fragment. If the missing fragment is found, and is found to have a shape which fulfills the shape requirements of the missing fragment, then the character is positively identified.

It is, therefore, an object of this invention to provide an apparatus for identifying a character fragment and then searching in an area which is logically spatially oriented with respect to the identified character fragment for the missing fragment necessary to identify the character fully, and if found, to complete the identification.

It is a further object to provide in a curve follower type character recognition apparatus means for identifying a character fragment, and means responsive to the identity thereof for controlling the curve follower to search in an area which is spatially related to the identified character fragment for the missing fragment necessary to conclusively identify the character.

A specific object of the invention is to provide an apparatus for identifying a discontinuously formed handwritten numeral wherein a curve follower is caused to follow one fragment of the numeral, identify it as a fragment of a given numeral, and then jump to an area which relative to the identified fragment would logically contain the second fragment.

A final object of the invention is to provide an apparatus which will identify a handwritten numeral five, which is formed by two disconnected strokes of the writing instrument.

The foregoing and other objects, features and advantages of the invention will be apparent from the following more particular description of a preferred embodiment of the invention, as illustrated in the accompanying drawings.

The invention is most easily comprehended with reference to the identification of the handwritten arabic numeral five. This numeral is most frequently formed by two strokes of the writing instrument, and when hastily executed, the horizontal upper bar, the slash, is detached from the vertical bar and depending semicircle, the sickle. A "broken five" formed in this fashion cannot be positively recognized by a curve follower type of character recognition device, unless the two separate fragments are logically connected.

Figure 1:
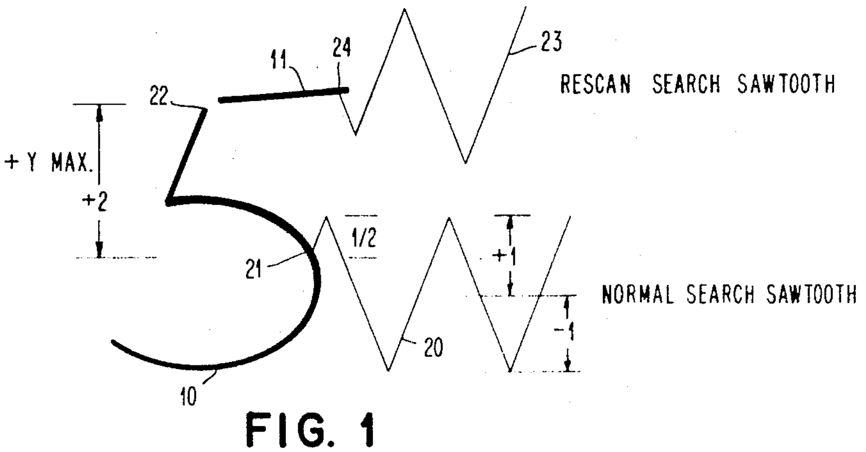
FIG. 1 illustrates the operation of the invention in treating a broken 5.

Referring now to FIG. 1, it will readily be appreciated that a curve follower operating to search for a character could first intercept either the sickle or the slash. If the sickle is first intercepted, the identification of its salient shape features may provide sufficient suspicion that the unknown shape is the sickle of a broken five to warrant further exploration for the missing slash. If the slash is found, and "finding" necessarily connotes that the slash is identified in fact as a slash in the proper relativity to the sickle, the recognition of the broken five is completed. If the slash is encountered first, then the subsequent identification of the sickle in its proper relative orientation completes the recognition.

Before proceeding with a detailed explanation of the operation of the invention it is well to digress and examine the environment in which the preferred embodiment of the invention finds its best use. It has been found expedient to identify people, places, things, events, etc., ad nauseam by numbers, zip codes, area codes, social security numbers, item numbers, part numbers, phone numbers, account numbers, meter numbers, serial numbers, to name but a few. This numerical system of vocabularly certainty has advantages. For example, parity checks may be built into the identification number or a "reasonableness test" may be applied to the statement of facts which is represented by the numerical statement. Finally, if nothing else, the decimal system of numeration provides a font of only ten characters as opposed to the alphabet of at least twenty-six characters. Working to the advantage of the character recognition machine is the fact that numerals are universally formed individually rather than in the cursive script mode. Thus, numbers present a considerably simplier problem to the character recognition machine, and one that can be readily solved with a commercially acceptable degree of accuracy, and sufficient "fail-safe" protections as to insure acceptance in the mercantile establishment.

The present invention is an improvement upon and extrapolation of that disclosed in the copending application of Essinger et al., Ser. No. 334,507, filed Dec. 30, 1963, now United States Patent No. 3,303,465, and the copending applications referenced therein. In that application, an electronic curve follower employing a finely focused spot from a cathode ray tube so animates the spot as to follow the outline of the unknown lexical symbol, developing, as it goes, time variant analog waveforms representing the X and Y coordinates of the trace. These waveforms are continuously processed to develop slope and matrix signals, which are binary in nature. The slope signals are developed by the prior apparatus and represented by selectively potentialized signal lines representing the vector heading N, NE, E, SE, S, SW, W, NW (compass rose points). The matrix signals represent the instantaneous orthogonal positions of the trace as related to a 4 x 5 matrix which is so normalized as to just encompass the maximum horizontal and vertical excursions of the particular character under a scrutiny. The apparatus in the referenced copending application makes a first pass around an unknown character wherein it measures the size of the character and adjusts its size to the 4 x 5 matrix. During the second trace, the apparatus develops the heading and matrix signals which are logically combined and tested for persistence to produce shape feature recognition signals. These shape features are further logically combined to yield the total recognition of the character. Each character, therefore, is defined as a combination of the presence and absence of certain features. The instant invention adds to that capability a further capability of finishing the second pass with a conditional recognition and instructions to seek further data in a prescribed area.

By means not germaine to the instant invention, a character search, effects a sawtooth type of search pattern 20, shown in FIG. 1. This search pattern may be a pure sawtooth, or may have a circular dither superimposed thereon. If the circular dither is present, it is so small in amplitude that its effect may be ignored for all practical purposes. When the sawtooth search pattern intercepts the sickle fragment 10, the sawtooth waveform voltages are frozen or locked at the values necessary to produce the X and Y displacement of the cathode ray tube beam to intercept the character at the point 21. The curve following action then proceeds in a clockwise direction, the follower actually servoing on the edge of the line. If as shown, the following yields a succession of headings from S, SW, W, NW, SE, E, NE, N, NW, W, SW, N, S, NE, E, SE, and a return to S. These headings will persist from various time periods and will have various minor variations in accordance with the vagaries of the individual's handwriting. The heading signals will also be accompanied by matrix signals in the maner described in the above-identified application. These signals would take the form of column (A, B, C or D) and row (M1, M2, M3, M4 or M5) signals to define the matrix position. The upper left corner would, for example, be AM1, upper right corner DM1, lower left corner AM5, and the lower right corner DM5. Other intervening positions would be suitably identified by combinations of 5 numercial rows and 4 alphabetical columns to define the twenty possible positions.

If the numeral five were completely formed, the circuits described in the referenced application would effect the recognition, and the instant invention would not be required nor would it be rendered operative. Only when the circuits of that prior apparatus yield a signal manifesting a failure to recognize the shape analyzed, and certain other shape recognition signals, will the instant invention become operative. These conditions precedent will now be examined.

Continuing the Boolean expressions employed in the referenced application, the vector heading signals are represented by the letters N, NE, E, SE, S, SW, W, and NW indicating the eight points of the compass rose. M1, M2, M3, M4 and M5 are employed to denote the respective horizontal rows of the matrix. The letters A, B, C and D are used to denote the four vertical matrix columns. Except for one variation standard Boolean algebra expressions are employed, including the use of parentheses (logical AND), + sign logical OR, and the bar over an expression, the logical NOT. The variation employed is the use of time as a variable. This expresses the condition that there must be a concurrence of the necessary events for a mininum of the expressed time period before a circuit will be appropriately conditioned. An example (from the referenced application) follows:

$$L6-5=(L6-4)(A+B)(M2+M3)(S+SW)(2TU)$$

means that latch 5 of the sixth test will be set if latch 4 remains set for two continuous time units together with A or B and M2 or M3, and a South or Southwest heading.

Figure 2:
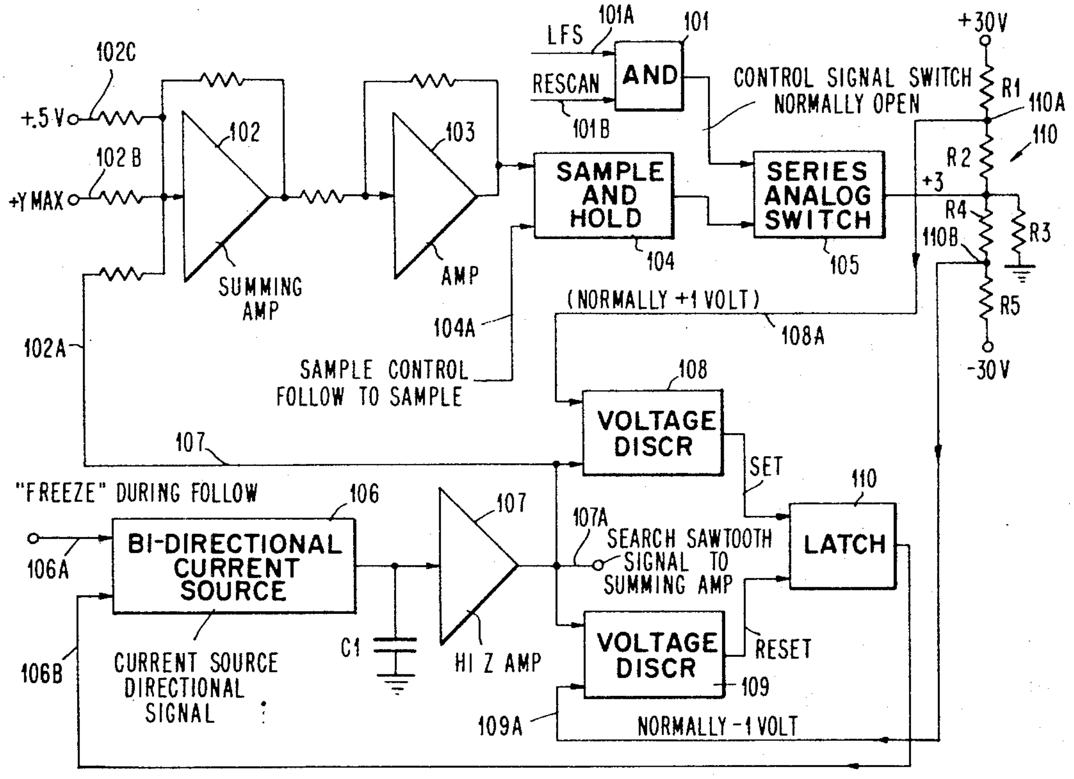
FIG. 2 shows the circuits for effecting the search scan and rescan.

Referring now to FIG. 2 of the instant application, the search potentials that produce the sawtooth search pattern 20 of FIG. 1 are produced by the circuit components 106 through 110. This combination of apparatus produces a voltage varying with respect to time, commonly called a sawtooth wave which would normally be applied to the terminal **208*a* of the vertical summing amplifier shown in the application Ser. No. 306,119, filed Sept. 3, 1963, of Greanias et al., referenced in the above-identified application, now United States Patent No. 3,289,004. At the same time, a more slowly varying voltage would be applied to the horizontal summing amplifier at the hub 209*a*. The net effect of these voltages would be a trace similar to that shown at 20 in FIG. 1. When the character is intercepted, as for example at 21, the "freeze" signal will be applied to the input terminal 106*a* of the bidirectional current source 106, thus fixing the horizontal and vertical deflection voltages on the cathode ray tube to those necessary to fix the coordinates of the point 21**.

The bidirectional current source 106 is a constant current device capable of producing a positive and negative current flow of constant value upon a command signal from line **106*b*. Since constant current produces a linear rate of charge in a capacitor, the voltage charge in capacitor C1 will vary linearly with time and will be alternately charged and discharged at a constant rate to effect the sawtooth waveform 20 shown in FIG. 1. The high impedance amplifier 107 serves to make the voltage charge on capacitor C1 available at the hub 107*a* without unduly loading the capacitor. The freeze signal applied to hub 106*a* merely cuts off the current source to capacitor C1**, leaving it at whatever charge it may have accumulated.

The control of the bidirectional current source 106 is vested in the latch or flip-flop 110 which alternates between the set and reset conditions under control of voltage discriminators 108 and 109. Normally, these discriminators have inputs of +1 volt and −1 volt, respectively, on the lines **108*a* and 109*a*. When the sawtooth waveform 20 achieves these peak values the appropriate voltage discriminator 108 or 109 will be activated to set or reset latch 110, reversing the direction of current flow in the current source 106 and charging the charge in capacitor C1**.

When through the alternate charging and discharging of C1, the cathode ray tube beam is caused to oscillate vertically through a 2 volt motivated excursion, while a slowly charging horizontal voltage is concurrently applied, to effect the sawtooth movement, an intercept at 21 will be effected. Curve following then proceeds in the manner described in the referenced applications. During this time, the maximum dimensions of the scan are stored as voltages in capacitors, there being four capacitors storing voltages representing the top and bottom of the scan and the left and right thereof.

Assuming for the movement that the sickle has been followed and determined to be a possible five fragment, then the upper circuits in FIG. 2 become operative to seek out and search for the missing slash. Since the slash is suspected to be above the highest point of the sickle, the summing amplifier 102 receives three inputs. The first input on line **102*a* represents the voltage necessary to achieve the vertical displacement at point 21 on the sickle. The second input 102*b* represents the most positive vertical displacement voltage achieved during the follower action. The third input 102c represents a constant voltage increment of +.5 volt to elevate the search raster above the highest point of the sickle. Thus, amplifier 103 will contain a voltage representing the sum of the vertical displacement voltage of point 21, the voltage necessary to elevate the trace to point 22, and a fixed increment to further elevate the cathode ray tube beam. The sample and hold circuit 104 is again a capacitor and high impedance amplifier circuit together with charging means for the capacitor which can store and manifest the voltage of the amplifier 103. This circuit is operative every character identification cycle, should its services be required. Thus, at the end of every recognition cycle, this sample and hold circuit 104 stores a voltage required to position for a slash search. If it is not needed, a control signal applied to line 104a** will reset the voltage storing circuits in preparation for the next cycle.

If, in FIG. 2, a LFS (look for slash) signal is present on line 101a and a rescan signal on line 101b AND gate 101 will be activated to close the switch 105. This switch will now inject the voltage in the sample and hold circuit 104 into the midpoint of voltage divider 110. The midpoint of this divider which formerly was at 0 volt will now be raised above that level to some value, +3 volts, for example. The taps 110a and 110b, formerly at +1 and −1 volt will now rise to approximately +4 and +2 volts, respectively. These voltages will be applied through lines 108a and 109a respectively to the voltage discriminators 108 and 109. The latch 110 will be immediately be set and if the bidirectional current source 106 is "unfrozen" by a control on line 101a, the capacitor C1 will be charged to +4 volts. The alternate charging and discharging of capacitor C1 will now proceed between +4 and +2 volts to effect the second sawtooth search 23. The horizontal component of this search will be effected by the same slowly charging voltage that produced the raster scan 20. The rescan signal causes the horizontal deflection voltage to reset and begin its change anew.

When the scan 23 intercepts the slash 11 at 24, the scanning circuits "freeze," and the follower action takes over. Circuits then become operative to identify the slash. If the slash had been detected first, the normal circuits for seeking out the next character would come into play, and the sickle shape would be found by operation of the regular scan circuits. The storage of the slash feature and the identification of the sickle completes the recognition.

Figure 3:
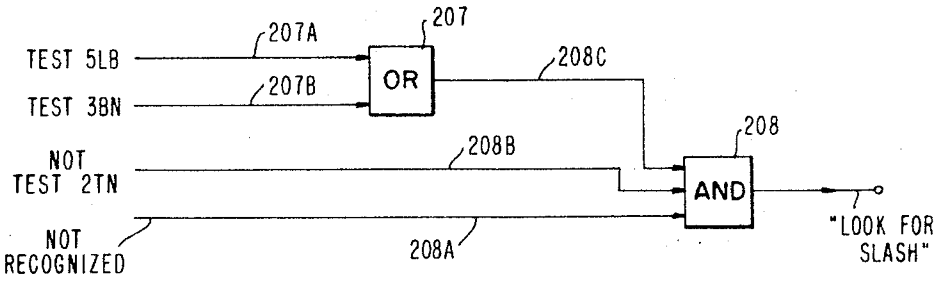
FIG. 3 shows the logic necessary to signal the search for a slash.

Reference has been made to various signals which necessarily connote feature recognition. The LFS (look for slash) signal applied to AND gate 101 is exemplary of these. FIG. 3 shows the development of the LFS signal. Here, the LFS signal is the AND of inputs from OR gate 207 and the absence of test 2TN (2 top normal) and the presence of failure of recognition signal. OR gate 207 yields an output if test 5LB (5 left bay) or 3BN (3 bottom normal) is present. These tests are similar to those set forth in the above-identified application of Greanias and Essinger. In fact, the 3BN test is test 022 set forth therein as follows:

$L22-1=(M5)(W)(2TU)$
$\overline{L22-1}=M1$
$L22-2=(L22-1)(M4+M5)(E+SE)(2TU)$
$\overline{L22-2}=(M5)(W)$
$L22-3=(L22-2)(M4+M5)(E+NE)(2TU)$
$L22-3$=END OF TEST The 5LB (5 left bay) has no exact counterpart in the foregoing application but is designed to detect the semicircular left pointing bay of the five (and of a 3). By analogy to tests set forth in the referenced application a five left bay test would proceed as follows:

$L5LB-1=(M4+M5)(SE+E)2TU$
$\overline{L5LB-1}=(M5)(W)$
$L5LB-2=(L5LB-1)(M4+M5)(E+NE)(2TU)$
$\overline{L5LB-2}=(M5)(W)$
$L5LB-3=(L5LB-2)(NE+N)(2TU)(C+D)$
$L5LB-4=(L5LB-3)(C+D)(N+NW+W)(2TU)$
$L5LB-4$=END OF TEST The 2TN (2 top normal test) required in FIG. 3 is test 021 in the referenced application set forth therein as follows:

$L21-1=(B+C+D)(M1+M2)(N+NE+NW)(3TU)$
$\overline{L21-1}=(M1)(SE+E)$
$I21-1=(L21-1)(M1+M2)(W+NW+SW)(6ITU)$
$\overline{I21-1}=M5$
$L21-2=I21-1$
$\overline{L21-2}=M5$
$L21-3=(L21-2)(M1)(E)$ If, in FIG. 3, the five left bay signal (5LB) or the three bottom normal test is present, there is an inference that a character fragment having a tail like a "3," "5" or "9" has been found. If the character is fully recognized, these features will have been used in their logical place in the standard recognition circuits. If a "broken five" is present and recognition cannot be achieved, the line 208a becomes energized and these tests contribute to the look for the slash. To prevent looking for a slash in a slash three numeral, the NOT of test 2TN is incorporated into AND 208. The LFS signal output from AND 208 is applied to the AND gate 101 to initiate the action previously traced with respect to FIG. 2 to cause the rescan operation in a search for the slash.

The slash logical circuits operate to recognize a slash much as they would any other characters. Essentially, they look for an end of line in zone A and in zone D of the matrix. These circuits are detailed in FIG. 4 wherein it will be seen that OR gate 250 will signal the appropriate end of line if there is a rapid reversal in the direction of travel. This is detected by injecting a SW heading signal into a short delay circuit 251 and ANDing in AND gate 252 with a NE heading. Since the former heading is slightly delayed and combined with a subsequent heading a line end will be detected. Similarly, AND gates 253, 254, and 255 will combine the former heading with the present reversed heading to detect other line ends. The W to E change is effected through delay 256 and AND 253. The NE to SW acts through delay 257 and AND 254. The E to W transition is measured in delay 258 and AND 255. Since line ends in zones A and D for a substantially horizontal or upward sloping slash will involve only these transitions, the OR gate 250 will provide sufficient resolution of line ends for the slash feature.

The end of line signal from OR 250 is combined in AND gate 259 with the A matrix column input signal to set latch 260. Latch 260 resets on 3 time units of any heading other than east or northeast. This reset is effected through OR 261 and inverter 262 the output of which is connected to AND gate 300 as is a time unit generator. Thus, latch 260 will be reset as the trace proceeds to the left on the underside of the slash and approaching the line end in zone A.

The end of line in zone D, if it is preceded by the end of line in zone A, will set latch 263 via AND 264 having inputs from latch 260 (end of line A), end of line signal (from OR 250), and matrix zone D input. Latch 263 will reset on 4 time units of headings other than W and SW, via OR 264 and inverter 265 as well as AND gate 301 and a time unit generator. The N or NE trace on the upper side of the slash will reset latch 263 before it is needed to be used and prevent false signalling.

The third and final latch 266 in the slash test series will be set if the latch 263 is set and either a second end of line in zone A occurs or there is a westward movement in zone 5. This latter condition arises by virtue of peculiarities in the circuits that measure the completion of a pass around a character. The setting of latch 266 is vested in AND gate 267 which has inputs from latch 263 and OR gate 268. OR gate receives the AND gate 269 output which detects the presence of a west heading in zone 5 of the matrix. The output from latch 266 signals the end of the slash test and derivatively the successful recognition of a broken five. Since a prerequisite for the slash test was the finding of a fragment of a suspected five, the very search for, finding and recognition of a slash completes the recognition of a broken five.

Figure 5:
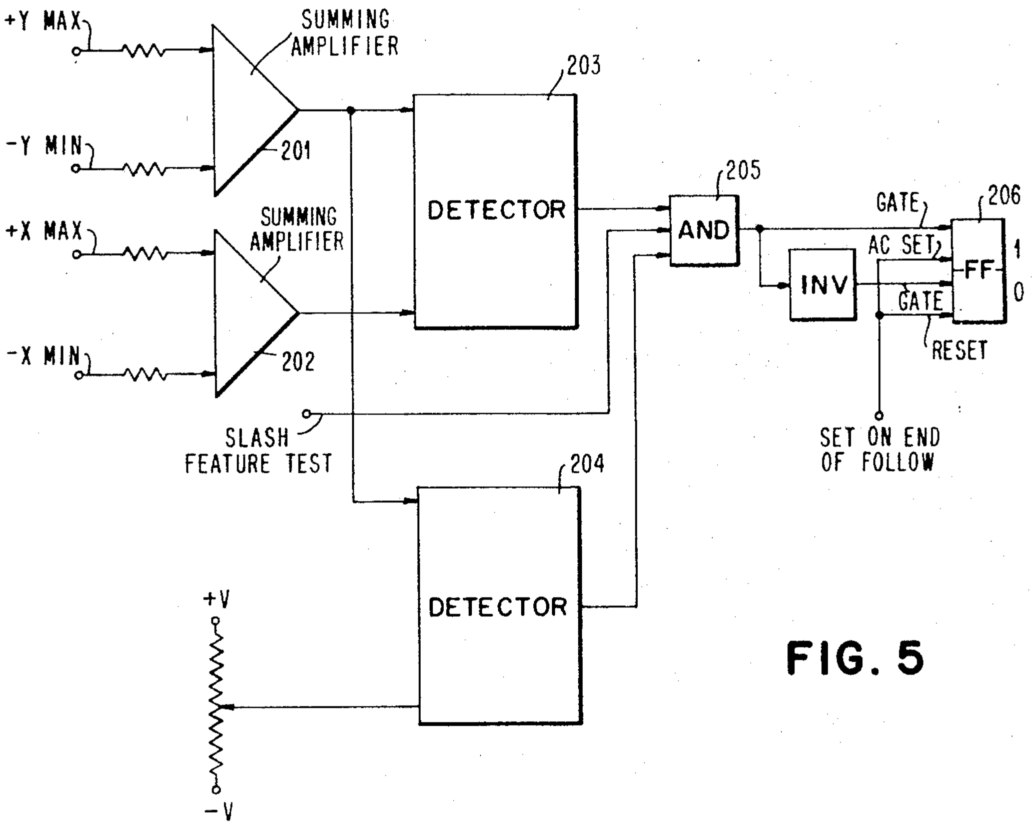
FIG. 5 shows circuits for measuring the relative dimension of a slash.
Figure 4:
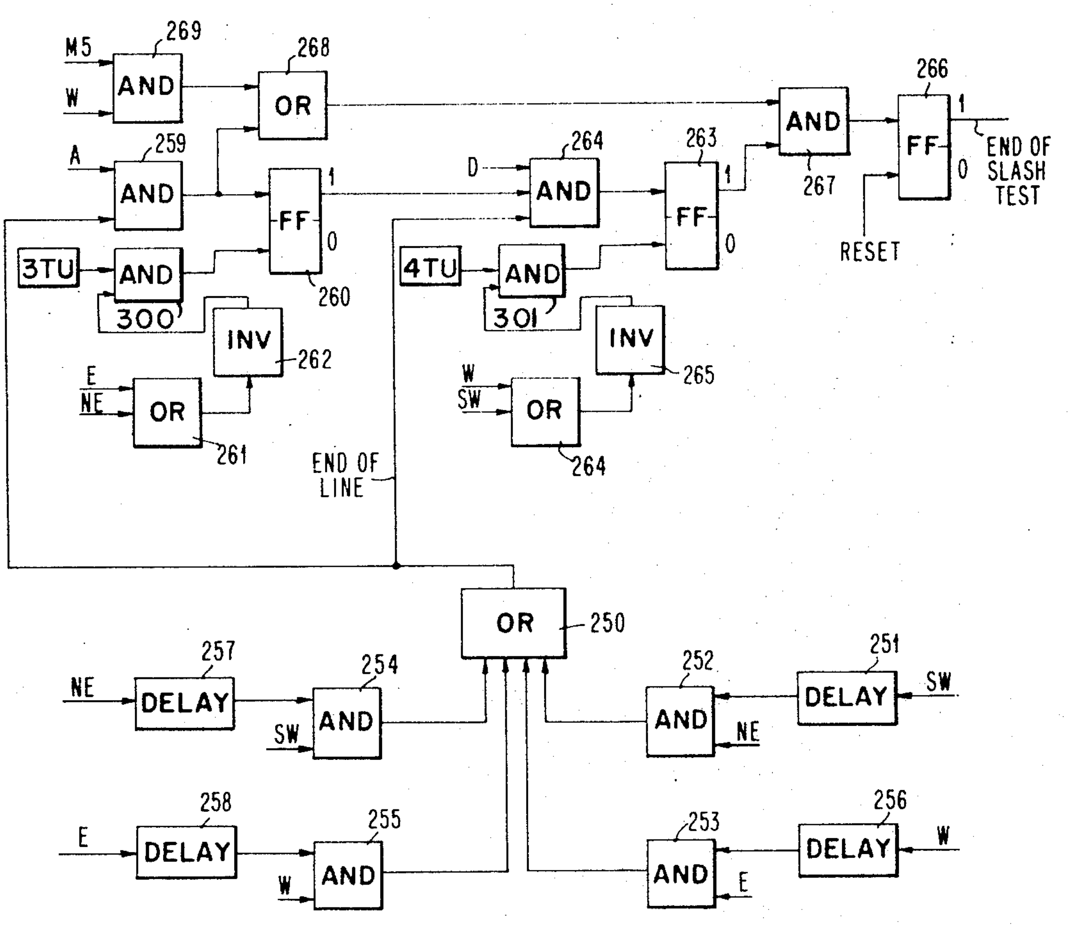
FIG. 4 shows the schematic circuits necessary to recognize a slash.

The final situation that merits attention is the converse of that just explored, namely intercepting the slash of a broken five before the sickle. In this instance, the circuits of FIG. 5 will operate to detect and store the existence of the slash. As is explained in the applications hereinabove referenced, the curve follower makes a first or measuring pass about each character during which time the maximum horizontal and vertical voltage excursions are stored. Since a slash is essentially a horizontal line, its height will be small compared with its breadth, even though the character will be normalized to fill the synthetic 4 x 5 matrix. The height of the character is measured by the voltage difference between $+Y_{max}$ and $-Y_{min}$ which is derived in the summing amplifier 202 by algebraically adding the $+X_{max}$ and $-X_{min}$ voltages obtained from the first measuring pass. If the character width (output of summing amplifier 201) is greater than the character height (output of summing amplifier 202), the voltage detector 203 will yield an output to partially energize AND gate 205. If the height of the character (as measured by the voltage output from summing amplifier 201) does not exceed a predetermined value (measured by voltage detector 204) set by the position of the tap on resistor R10, then a further input to AND 205 will be established. The third necessary input to AND is the success of the slash feature test viz the set condition of latch 266 (FIG. 4). When these three conditions have been satisfied, the latch 206 will be set and the end of the following action signalled by a control pulse on line 206*a*, provided that AND gate 205 yields its requisite output. The inverter 209 prevents the pulse on 206 from resetting latch 206 at this time, but will permit its reset during the next identification cycle.

With the standard end of follow signal and latch 206 set, the apparatus will function to seek out the next character in its normal operating mode. Since a normal scan proceeds from the previous character as a reference, the search for the next character will intercept the sickle of the broken five. Now, however, the latch 206 will substitute for the feature test that looks for the top in a normal unbroken five and will complete the recognition. The storage of the slash in latch 206 effectively pieces together the sickle and the slash to complete the five identification.

While the invention has been illustrated with respect to its most likely environment, it will readily be appreciated that other disjointed lexical symbols can be similarly recognized. The operation requires the recognition of a portion of a character as a potential fragment of a given character and then a further search in a given area referenced to and controlled by the metes and bounds of the first identified portion and analysis of the line pattern therein contained for the necessary shape features.

While the invention has been particularly shown and described with reference to a preferred embodiment thereof, it will be understood by those skilled in the art that various changes in form and details may be made therein without departing from the spirit and scope of the invention.

What is claimed is:

1. In a character recognition apparatus, means for identifying a discontinuously formed symbol comprising:

(a) means for following the outline of a potential physically separated partial portion of a lexical symbol;

(b) portion recognition means responsive to said means for following for establishing the identity of the followed partial portion as a potential portion of a known lexical symbol;

(c) means for searching in a predetermined pattern only in an area spatially related to the area occupied by the identified partial portion where the missing character partial portion necessary to complete the character shape would be expected to be located;

(d) and means responsive to the interception of an apparent missing partial portion located by said means for searching for following the outline of said apparent missing partial portion and analyzing the shape thereof to complete the character recognition.

2. In a character recognition machine, means for identifying a lexical symbol formed by two disconnected strokes of a writing instrument, comprising:

(a) means for following the outline of one apparent fragment of a symbol, analyzing the shape thereof, and producing a manifestation of the identity thereof as a possible component shape of a complete known lexical symbol;

(b) means responsive to said manifestation for searching only in an area where a missing fragment necessary to complete the symbol identification would be expected to be located relative to the area occupied by said apparent fragment;

(c) and means for following and identifying the shape of any mark found during searching to determine whether it is the missing fragment and to complete the recognition when it is identified as the missing fragment.

3. In a character recognition machine employing a curve follower apparatus as the scanner for scanning the lexical symbol, apparatus for identifying a handwritten arabic numeral five when it is disjointedly formed by two separate strokes of a writing instrument, comprising:

(a) means for following the sickle-shaped fragment and establishing its identity as a potential fragment of the numeral five by recognizing the reentrant semicircular shape of the sickle and manifesting this shape feature;

(b) means responsive to the manifesting of the said shape feature and the failure to identify any known complete lexical symbol for initiating a search for the horizontal upper bar of the numeral five;

(c) means for referencing the search for the horizontal upper bar to the area occupied by the sickle shape to search above and to the right of the top line end of the sickle shape;

(d) means for detecting a substantially horizontal line in the area searched and manifesting such detection;

(e) and means responsive to the manifesting of the detection of the substantially horizontal line for completing the recognition of the numeral five.

4. In a curve follower type of character recognition apparatus means for identifying a disjointedly formed arabic numeral five, comprising:

(a) means for identifying the disjointed horizontal upper bar, or slash, by measuring the ratio of width to height of the slash, detecting oppositely disposed line ends, and manifesting the presence of a slash thus measured;

(b) means for following the remaining sickle-shaped fragment and analyzing its shape;

(c) means responsive to the analysis of the shape of the sickle fragment and the manifesting of the slash shape for identifying the disjointedly formed numeral five.

5. A character recognition machine, comprising:

(a) a curve follower apparatus for following the outline of a fragment of a physically separated partial portion of a lexical symbol and producing time variant waveforms manifestive of the shape of the trace;

(b) means responsive to the said waveforms for generating direction signals and positional signals representing respectively the instantaneous velocity headings and spatial locations of the outline of the symbol;

(c) means for analyzing the succession and persistance of said direction and positional signals to identify a fragment of a known lexical symbol;

(d) means responsive to the maximum amplitudes of said waveforms for positioning said curve follower apparatus to search only in an area related to the said fragment where a corresponding missing fragment necessary to completely identify the lexical symbol would be expected to be located.

6. In a curve follower type of character recognition machine wherein the curve follower is unable to completely follow the outline of a disjointedly formed lexical symbol, means for identifying the symbol, comprising:

(a) means for following a physically separated fragment of a symbol and establishing its identity as a potential component portion of a known lexical symbol;

(b) means responsive to the establishment of that identity for searching for the corresponding missing fragment only in an area where said missing fragment would be expected to be located relative to the area containing the identified fragment;

(c) means responsive to the interception of a mark which might be the missing fragment for identifying its shape and completing the recognition of the symbol.

References Cited

UNITED STATES PATENTS

| | | | |
|---|---|---|---|
| 3,050,581 | 8/1962 | Bomba et al. | 250—202 |
| 3,289,004 | 11/1966 | Greanias et al. | 210—217 |
| 3,213,421 | 10/1965 | Abraham | 250—202 X |
| 3,303,465 | 2/1967 | Essinger | 340—146.3 |
| 3,353,024 | 11/1967 | Stockdale | 340—146.3 |

MAYNARD R. WILBUR, Primary Examiner

SOL SHEINBEIN, Assistant Examiner

U.S. Cl. X.R.

250—202